United States Patent
Suzuki

(10) Patent No.: US 10,061,630 B2
(45) Date of Patent: Aug. 28, 2018

(54) IMAGE FORMING APPARATUS THAT ENSURES OPERATION WHILE HDD IS INOPERATIVE, AND RECORDING MEDIUM THEREFOR

(71) Applicant: KYOCERA Document Solutions Inc., Osaka (JP)

(72) Inventor: Masahiro Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 68 days.

(21) Appl. No.: 15/274,875

(22) Filed: Sep. 23, 2016

(65) Prior Publication Data

US 2017/0109220 A1 Apr. 20, 2017

(30) Foreign Application Priority Data

Oct. 20, 2015 (JP) ................. 2015-206114

(51) Int. Cl.
*G06F 11/07* (2006.01)
*G06F 3/06* (2006.01)
*H04N 1/32* (2006.01)

(52) U.S. Cl.
CPC .......... *G06F 11/073* (2013.01); *G06F 3/0617* (2013.01); *G06F 3/0629* (2013.01); *G06F 3/0685* (2013.01); *G06F 11/0733* (2013.01); *G06F 11/0793* (2013.01); *H04N 1/32646* (2013.01)

(58) Field of Classification Search
CPC .................................................... G06F 11/073
USPC ................................................. 714/6.11, 23
See application file for complete search history.

(56) References Cited

U.S. PATENT DOCUMENTS

| 2006/0080330 A1* | 4/2006 | Sugino ................ G06F 11/0733 |
| 2006/0080483 A1* | 4/2006 | Ogasawara ......... G11B 19/2054 710/74 |
| 2009/0106584 A1* | 4/2009 | Nakayama .......... G06F 11/0727 714/6.11 |
| 2011/0320706 A1* | 12/2011 | Nakajima ........... G06F 11/0727 711/114 |
| 2011/0320748 A1 | 12/2011 | Hamaguchi .................. 711/154 |

(Continued)

FOREIGN PATENT DOCUMENTS

| JP | 2002-149500 A | 5/2002 |
| JP | 2012-8861 A | 1/2012 |

OTHER PUBLICATIONS

Extended European Search Report dated Feb. 7, 2017, issued by the European Patent Office in corresponding application EP 16193848.5.

(Continued)

*Primary Examiner* — Kamini B Patel
(74) *Attorney, Agent, or Firm* — Stein IP, LLC

(57) ABSTRACT

An image forming apparatus includes an HDD, an HDD confirming unit, a system control unit, and a non-volatile semiconductor storage device. The HDD stores user data created by a user. The HDD confirming unit determines whether or not the HDD is in an inoperative state. The system control unit separates the HDD from the image forming apparatus to set the image forming apparatus to a restriction mode when the HDD is in the inoperative state. The non-volatile semiconductor storage device stores system data used for an operation of the system control unit.

5 Claims, 4 Drawing Sheets

(56) References Cited

U.S. PATENT DOCUMENTS

2012/0023379 A1* 1/2012 Kai .................... G06F 11/0727
                                                        714/57
2014/0380091 A1* 12/2014 Konishi ............. G06F 11/1088
                                                       714/6.23

OTHER PUBLICATIONS

Japanese Office Action dated Mar. 3, 2018, issued by the Japanese Patent Office in corresponding application JP 2015-206114.

* cited by examiner

IMAGE FORMING APPARATUS THAT ENSURES OPERATION WHILE HDD IS INOPERATIVE, AND RECORDING MEDIUM THEREFOR

INCORPORATION BY REFERENCE

This application is based upon, and claims the benefit of priority from, corresponding Japanese Patent Application No. 2015-206114 filed in the Japan Patent Office on Oct. 20, 2015, the entire contents of which are incorporated herein by reference.

BACKGROUND

Unless otherwise indicated herein, the description in this section is not prior art to the claims in this application and is not admitted to be prior art by inclusion in this section.

Many of typical image forming apparatuses store data in a Hard Disk Drive (an HDD) as a non-volatile storage device. In this case, when the HDD becomes inoperative, this may cause the image forming apparatus to become unusable.

In this respect, there is proposed a following hard disk drive device. The hard disk drive device gives an instruction of writing or reading to an HDD and, based on its response time, predicts in advance whether or not the HDD is inoperative to separately operate before the HDD becomes inoperative.

SUMMARY

An image forming apparatus according to one aspect of the disclosure includes an HDD, an HDD confirming unit, a system control unit, and a non-volatile semiconductor storage device. The HDD stores user data created by a user. The HDD confirming unit determines whether or not the HDD is in an inoperative state. The system control unit separates the HDD from the image forming apparatus to set the image forming apparatus to a restriction mode when the HDD is in the inoperative state. The non-volatile semiconductor storage device stores system data used for an operation of the system control unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
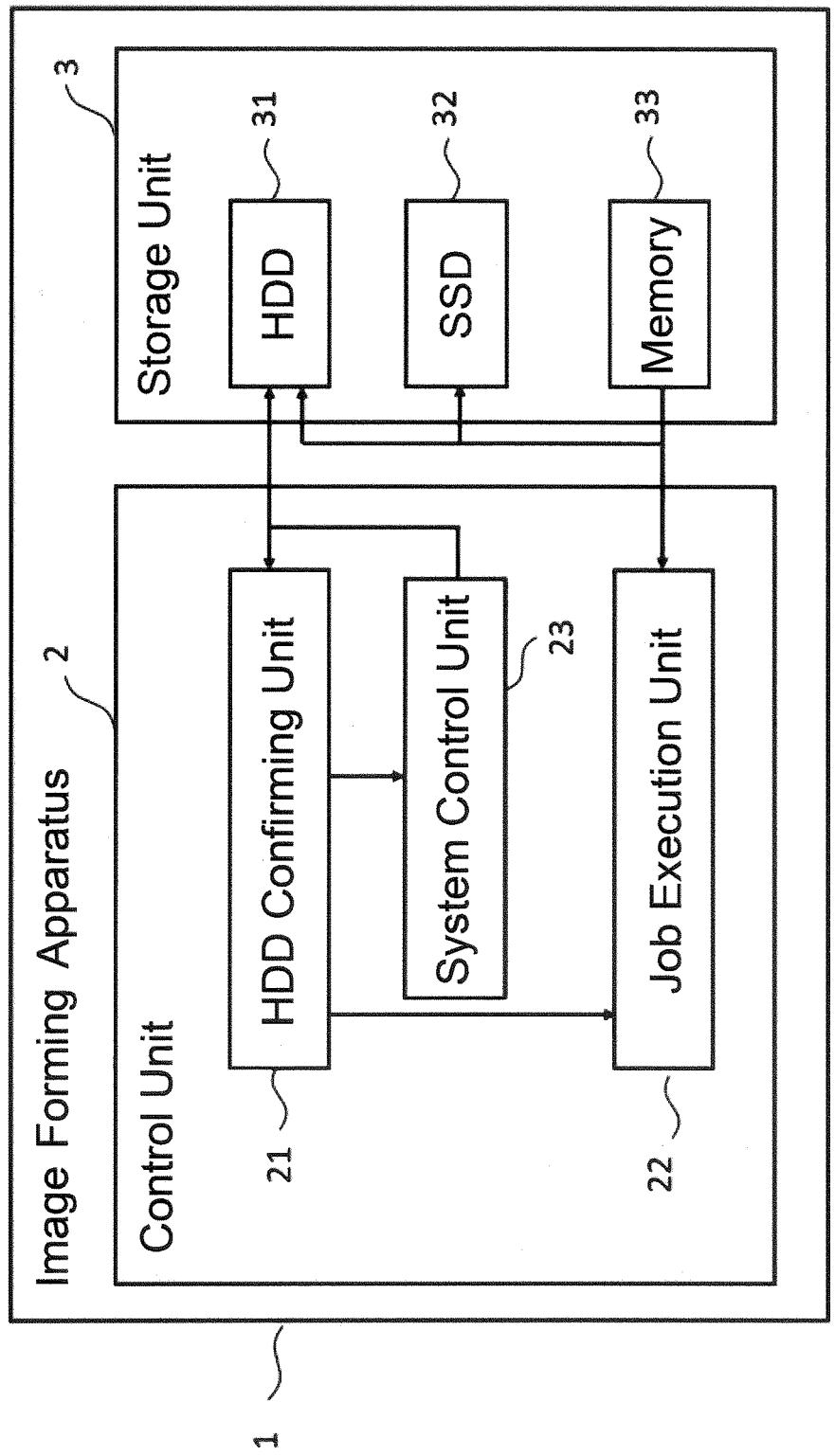
FIG. 1 illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 illustrates a configuration of an image forming apparatus 1 according to one embodiment of the disclosure. The image forming apparatus 1 includes a control unit 2 and a storage unit 3.

The control unit 2 includes an HDD confirming unit 21, a job execution unit 22, and a system control unit 23. The image forming apparatus 1 causes the control unit 2 and the storage unit 3 to operate to constitute a system to execute functions (for example, copying, scanning, and printing) of the image forming apparatus 1.

The control unit 2 is, for example, a processor, such as a Central Processing Unit (CPU), and an execution of a program causes the control unit 2 to operate as the HDD confirming unit 21, the job execution unit 22, and the system control unit 23.

System data including the program executed by the control unit 2 is stored in an SSD (Solid State Drive) 32. The SSD 32 is a non-transitory computer-readable recording medium. The system data is read from the SSD 32 to be loaded when a system is booted (the image forming apparatus 1 is turned on).

The HDD confirming unit 21 determines whether or not the HDD 31 is in an inoperative state after a failure of an HDD 31 is notified. The detail will be described later.

The job execution unit 22 executes printing, scanning, and other jobs of the image forming apparatus 1. For the execution of the jobs, when the job execution unit 22 stores data (user data) created by a user for the job, for example, an image read from a scanner for copying, and the job execution unit 22 stores the data in the HDD 31 insofar as the HDD 31 is usable.

The system control unit 23 separates the HDD 31 from the system. In other words, the system control unit 23 disables the HDD 31. In addition, the system control unit 23 sets an operation mode of the image forming apparatus 1 to a normal mode or a restriction mode. The normal mode is a mode where the job is executed after the user data is stored in the HDD 31. The restriction mode is a mode where the job is executed in a state where the HDD 31 is separated from the system. An initial value is set to the normal mode.

The storage unit 3 includes the HDD 31, the SSD 32, and a memory (a volatile storage device) 33.

The HDD 31 has a storage region that stores the user data (used for the job) created by the user.

The SSD 32 has a storage region that stores the system data. The SSD 32 is a non-volatile semiconductor storage device, such as a flash (registered trademark) memory, and has a limitation on the number of writings.

The memory 33 is a volatile semiconductor storage device, such as a Random Access Memory (RAM).

The following describes a procedure of determining that the HDD 31 is inoperative.

Figure 2A:
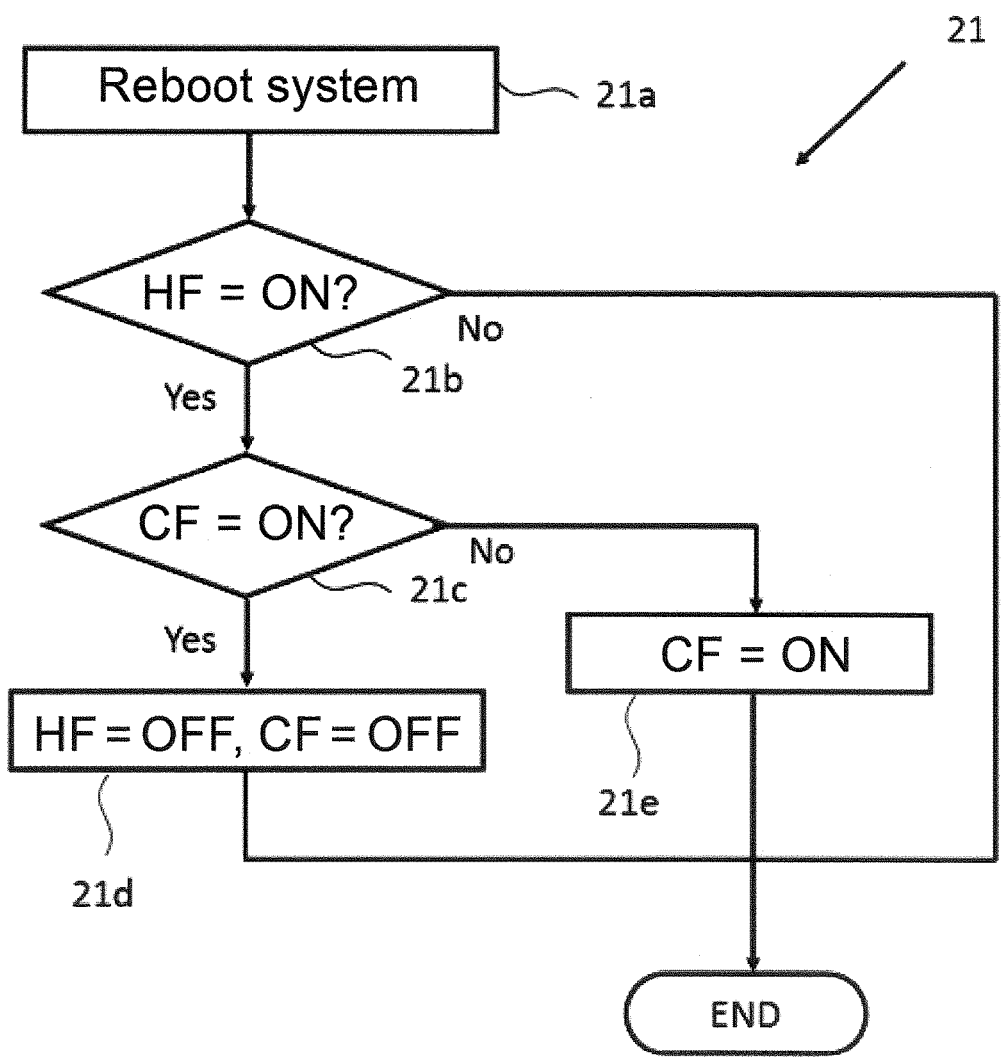
FIG. 2A illustrates a process executed by an HDD confirming unit when a system is booted (including a reboot)
Figure 2B:
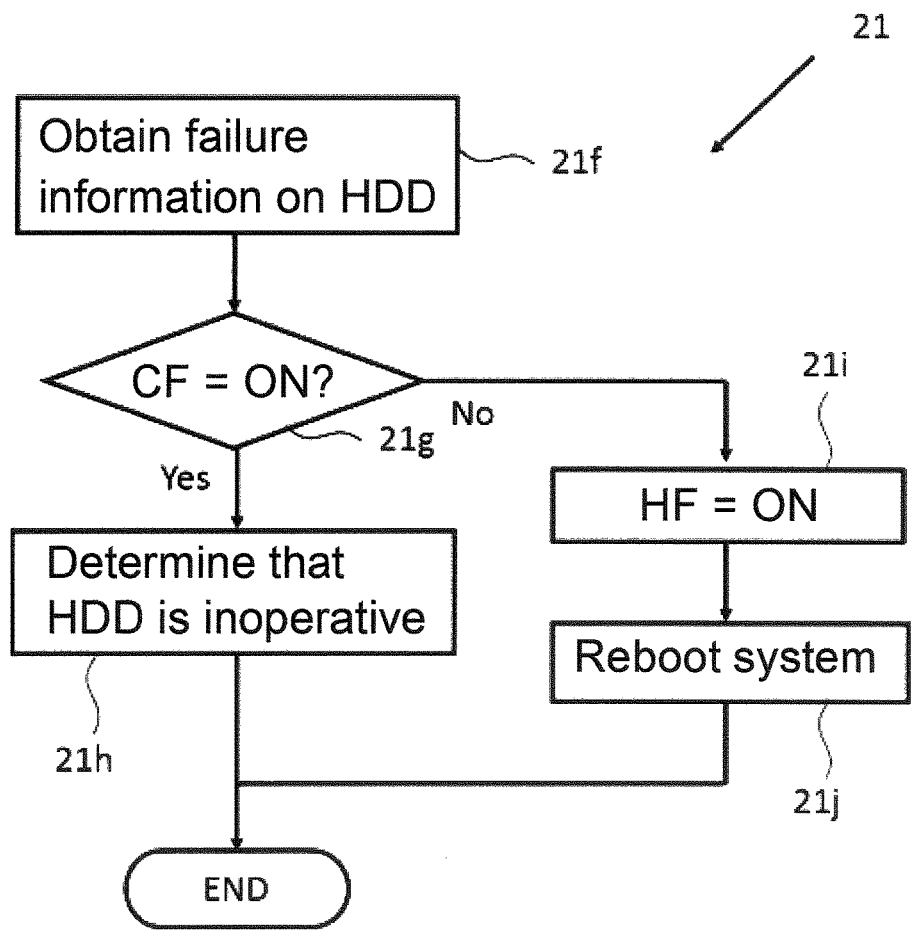
FIG. 2B illustrates a process executed by the HDD confirming unit when failure information on an HDD is obtained during the system boot.

FIGS. 2A and 2B illustrate processes of the HDD confirming unit 21. The HDD confirming unit 21 operates when the system is booted (including a reboot), and when failure information on the HDD 31 is obtained while the system is booted or while the system is operating after the booting. When the HDD 31 does not respond in the process executed by the control unit 2, the failure information on the HDD 31 is obtained. This causes the control unit 2 to initiate the HDD confirming unit 21.

The HDD confirming unit 21 uses two flags: a flag HF (a failure history flag: a flag indicating existence of a failure history); and a flag CF (a cut-off flag: a flag indicating necessity for separating the HDD 31 from the system). When the failure history flag HF indicates "ON," the failure history flag HF means the existence of the failure history of the HDD 31. When the failure history flag HF indicates "OFF," the failure history flag HF means absence of the failure history of the HDD 31. When the cut-off flag CF indicates "ON," the cut-off flag CF means the necessity for separating the HDD 31 from the system. When the cut-off flag CF indicates "OFF," the cut-off flag CF means unnecessity of separating the HDD 31 from the system.

First, the following describes a process executed when the system is booted (including the reboot).

As illustrated in FIG. 2A, when the system is rebooted (Step 21a), the HDD confirming unit 21 firstly confirms whether or not the failure history flag HF indicates "ON" (Step 21b). The failure history flag HF indicating "OFF" (No at Step 21b) means the absence of the failure history of the HDD 31. This causes the HDD confirming unit 21 to terminate the process without executing anything, which leads to the continuance of the normal mode.

When the failure history flag HF indicates "ON" (Yes at Step 21b), the HDD confirming unit 21 branches the process based on a value of the cut-off flag CF (Step 21c). When the cut-off flag CF indicates "OFF" (No at Step 21c), this causes the HDD confirming unit 21 to set the cut-off flag CF to "ON" (Step 21e). At this time, the failure history flag HF indicates "ON," which means the existence of the failure history of the HDD 31 at a previous boot. This causes the HDD 31 to be separated from the system when the failure of the HDD 31 is detected later. However, the operation mode of the image forming apparatus 1 is still in the normal mode.

When the cut-off flag CF indicates "ON" (Yes at Step 21c), the HDD confirming unit 21 sets both the failure history flag HF and the cut-off flag CF to "OFF" (Step 21d). The cut-off flag CF indicated "ON" until the previous boot. Nevertheless, the system has been rebooted without separating the HDD 31 from the system. This means that the failure of the HDD 31 was not detected at the previous boot at which the system operated with the cut-off flag CF indicating "ON." That is, this means that a failure of the HDD 31 detected at the last but one boot has been repaired at the previous boot. The failure is repaired, which causes a normal operation with both the failure history flag HF and the cut-off flag CF that are set to "OFF." That is, the normal mode still continues. As described above, the HDD confirming unit 21 does not determine an inoperative state when a failure of the HDD 31 has been detected only once. The HDD confirming unit 21 determines the inoperative state when the failure of the HDD 31 is detected again after the system is booted in a state where the failure of the HDD 31 has been detected.

It is likely that the failure at the last but one boot was caused by a file system error and has been repaired at the previous boot.

Next, the following describes a process executed when the failure of the HDD 31 is detected.

As illustrated in FIG. 2B, when the failure information on the HDD 31 is obtained (Step 21f), the HDD confirming unit 21 branches the process based on the value of the cut-off flag CF (Step 21g). When the cut-off flag CF indicates "ON" (Yes at Step 21g), the HDD confirming unit 21 determines that the HDD 31 is inoperative. At this time, the system control unit 23 separates the HDD 31 from the system to set the operation mode of the image forming apparatus 1 to the restriction mode. After the system control unit 23 separates the HDD 31, the HDD confirming unit 21 terminates the process. After Step 21h, the HDD confirming unit 21 may set "HF=OFF" and "CF=OFF" so as to reset both the failure history flag HF and the cut-off flag CF when the already-separated HDD 31 is exchanged.

The system control unit 23 may reboot the system after the system control unit 23 separates the HDD 31. In this case, the HDD confirming unit 21 may not execute the process illustrated in FIG. 2A.

When the cut-off flag CF indicates "OFF" (No at Step 21g), the HDD confirming unit 21 sets the failure history flag HF to "ON." That is, the HDD confirming unit 21 causes the system control unit 23 to separate the HDD 31 from the system when the failure information on the HDD 31 is obtained again also after the system is rebooted in the future. Then, the system control unit 23 reboots the system (Step 21j). At this time, after the execution of the process illustrated in FIG. 2A, the normal mode still continues.

The above-described process causes the HDD 31 to be separated from the system when the failure occurs both before and after the system is rebooted. When the system control unit 23 monitors the value of the cut-off flag CF to find "CF=ON," the system control unit 23 separates the HDD 31 from the system.

The following describes a process executed by the job execution unit 22.

Figure 3:
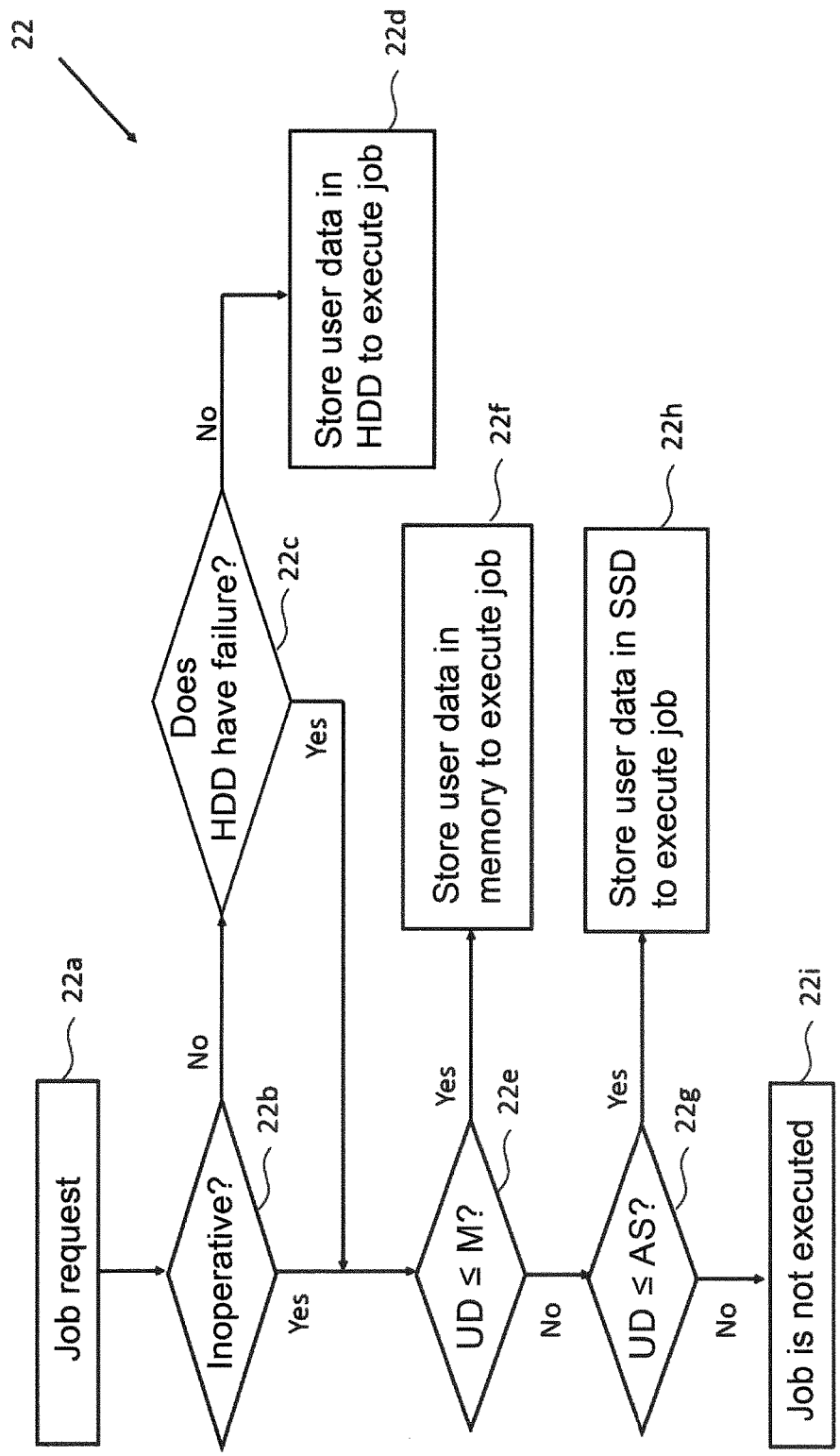
FIG. 3 illustrates a process executed by a job execution unit.

FIG. 3 illustrates the process executed by the job execution unit 22. When the job execution unit 22 receives a job request (Step 22a), the job execution unit 22 attempts to execute the job.

The job execution unit 22 checks whether or not the HDD confirming unit 21 determines that the HDD 31 is inoperative (Step 22b). When the HDD confirming unit 21 does not determine that the HDD 31 is inoperative, the job execution unit 22 stores the user data in the HDD 31 to execute the job (Step 22d) unless the HDD 31 has the failure (Step 22c). At this time, the image forming apparatus 1 operates in the normal mode.

When the failure of the HDD 31 is detected, the HDD 31 is unusable. This causes the job execution unit 22 to execute a process similar to the process executed when the HDD confirming unit 21 determines that the HDD 31 is inoperative (Step 22c). While the HDD confirming unit 21 can determine the failure of the HDD 31 based on the two flags HF and CF, the failure may be detected through the execution of the job for the first time. Thus, the HDD confirming unit 21 may determine the existence of the failure by performing the writing in the HDD 31.

The following describes a process executed when the HDD confirming unit 21 determines that the HDD 31 is inoperative, that is, when the system control unit 23 separates the HDD 31 from the system. In this case, the image forming apparatus 1 operates in the restriction mode.

The job execution unit 22 checks a size UD of the user data. After that, the job execution unit 22 checks a free space M of the memory 33. When the relation between the size UD and the free space M is "UD≤M" (Step 22e), the job execution unit 22 stores the user data in the memory 33 to execute the job (Step 22f). The reason for checking the free space of the memory 33 is that the free space varies based on another job when a plurality of jobs are simultaneously executed. However, the job execution unit 22 executes the jobs one by one, and may employ a value of M having the largest value for all the jobs to execute many jobs in a state where the HDD 31 is separated.

When the relation between the size UD and the free space M is "UD>M," the job execution unit 22 compares an acceptable-writing-data amount AS of the SSD 32 with the size UD of the user data (Step 22g). After the comparison, when the relation between the size UD and the acceptable-writing-data amount AS is "UD≤AS," the job execution unit 22 stores the user data in the SSD 32 to execute the job (Step 22h). Here, "AS" is the largest-writing-data amount per one time and is determined to ensure the maintained lifespan of the SSD 32. However, since the SSD 32 has the limitation on the number of writings, the job execution unit 22 may not execute Steps 22g and 22h to maintain the lifespan of the SSD 32.

When the user data cannot be stored in neither the memory 33 nor the SSD 32, the job execution unit 22 does not execute the job (Step 22i).

While, as described above in detail, the image forming apparatus 1 of the embodiment includes the only one HDD 31, the image forming apparatus 1 uses the system data stored in the SSD 32, which does not require another HDD instead of the separated HDD. Thus, the image forming apparatus 1 operates with the HDD 31 automatically separated from the system when the HDD 31 is inoperative. This ensures the requirement for, for example, cost reduction and downsizing.

For example, assume that the jobs are executed one by one in the restriction mode, and the free space M of the memory 33 is larger than a space for image data of one paper sheet. This ensures reliable executions of basic functions, such as copying and scanning, even if the system control unit 23 separates the HDD 31 from the system.

The disclosure provides the image forming apparatus including the only one HDD. The image forming apparatus is operable by separating the HDD while the HDD is inoperative. The disclosure may be employed by many image-forming-apparatus manufacturers and image-forming-apparatus users.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an HDD that stores user data created by a user;
   an HDD confirming unit that determines whether or not the HDD is in an inoperative state;
   a system control unit that separates the HDD from the image forming apparatus to set the image forming apparatus to a restriction mode when the HDD is in the inoperative state; and
   a non-volatile semiconductor storage device that stores system data used for an operation of the system control unit, wherein
   the HDD confirming unit
      obtains failure information on the HDD if the HDD does not respond,
      determines that the HDD is in an inoperative state if a cut-off flag indicating necessity for separating the HDD from a system to execute functions of the image forming apparatus indicates an ON state when obtaining the failure information,
      sets a failure history flag indicating existence of a failure history to the ON state if the cut-off flag indicates an OFF state when obtaining the failure information,
      sets the cut-off flag to the ON state if the failure history flag has been set to the ON state and the cut-off flag has been set to the OFF state when the system is booted, and
      sets the failure history flag and the cut-off flag to the OFF state if the failure history flag and the cut-off flag have been set to the ON state when the system is booted.

2. The image forming apparatus according to claim 1, further comprising:
   a job execution unit that executes a job,
   wherein the job execution unit executes the job where user data is storable in the non-volatile semiconductor storage device in the restriction mode.

3. The image forming apparatus according to claim 1, further comprising:
   a job execution unit that executes a job; and
   a volatile storage device,
   wherein the job execution unit executes a job where user data is storable in the volatile storage device in the restriction mode.

4. The image forming apparatus according to claim 1, wherein the HDD confirming unit does not determine an inoperative state when a failure of the HDD has been detected only once, and the HDD confirming unit determines the inoperative state when the failure of the HDD is detected again after the image forming apparatus is booted in a state where the failure of the HDD has been detected.

5. A non-transitory computer-readable recording medium storing an image forming program to control a computer of an image forming apparatus including an HDD and a non-volatile semiconductor storage device, the HDD storing user data created by a user, the non-volatile semiconductor storage device storing system data used for an operation of the computer, the image forming program causing the computer to operate as:
   an HDD confirming unit that determines whether or not the HDD is in an inoperative state; and
   a system control unit that separates the HDD from the computer to set the image forming apparatus to a restriction mode when the HDD is in the inoperative state, wherein
   the HDD confirming unit
      obtains failure information on the HDD if the HDD does not respond,
      determines that the HDD is in an inoperative state if a cut-off flag indicating necessity for separating the HDD from a system to execute functions of the image forming apparatus indicates an ON state when obtaining the failure information,
      sets a failure history flag indicating existence of a failure history to the ON state if the cut-off flag indicates an OFF state when obtaining the failure information,
      sets the cut-off flag to the ON state if the failure history flag has been set to the ON state and the cut-off flag has been set to the OFF state when the system is booted, and
      sets the failure history flag and the cut-off flag to the OFF state if the failure history flag and the cut-off flag have been set to the ON state when the system is booted.

* * * * *